Oct. 19, 1948.  A. M. CANDY  2,451,716
MECHANISM FOR STUD WELDING GUNS AND THE LIKE
Filed Sept. 28, 1946  2 Sheets-Sheet 1
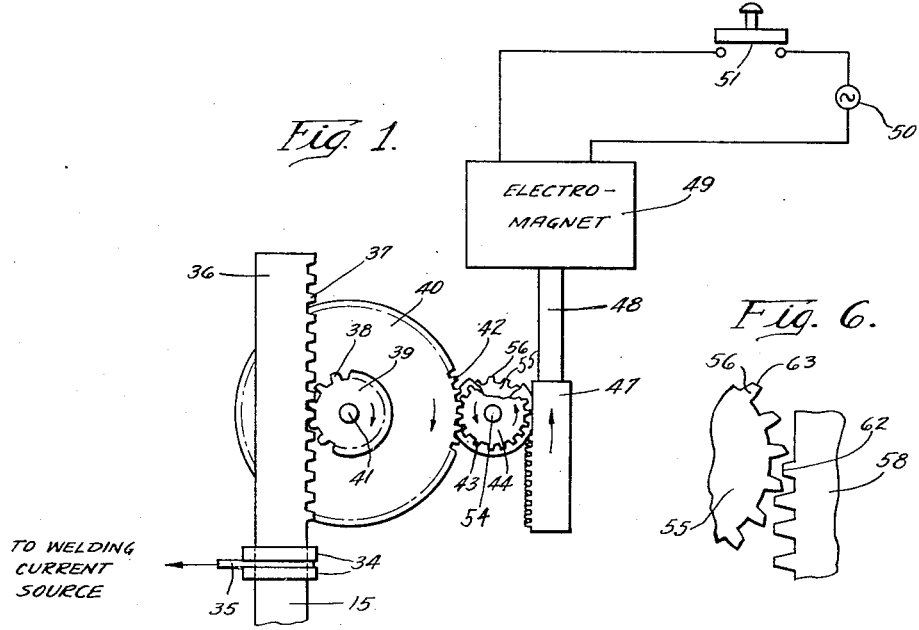
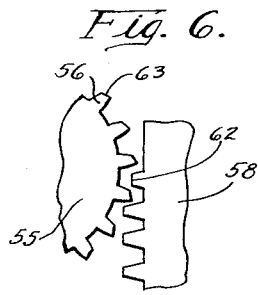
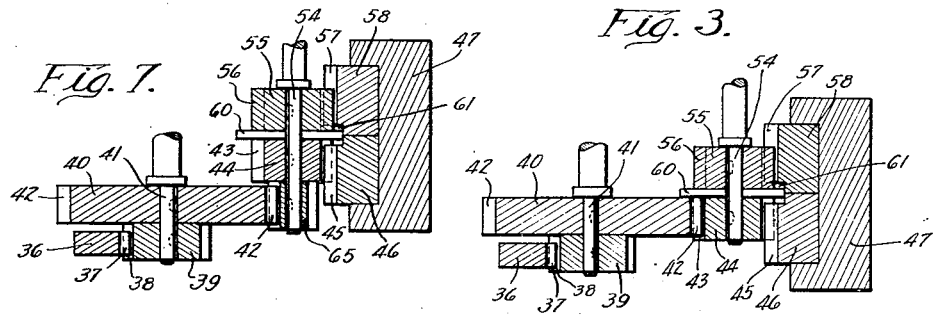
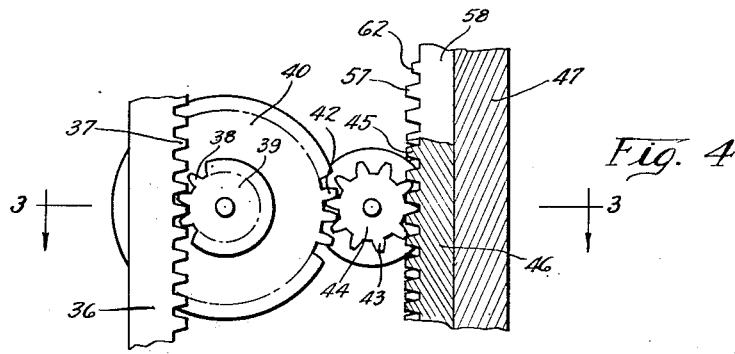
Inventor:
Albert M. Candy,
By Brown, Jackson, Boettcher & Dienner
Attys.

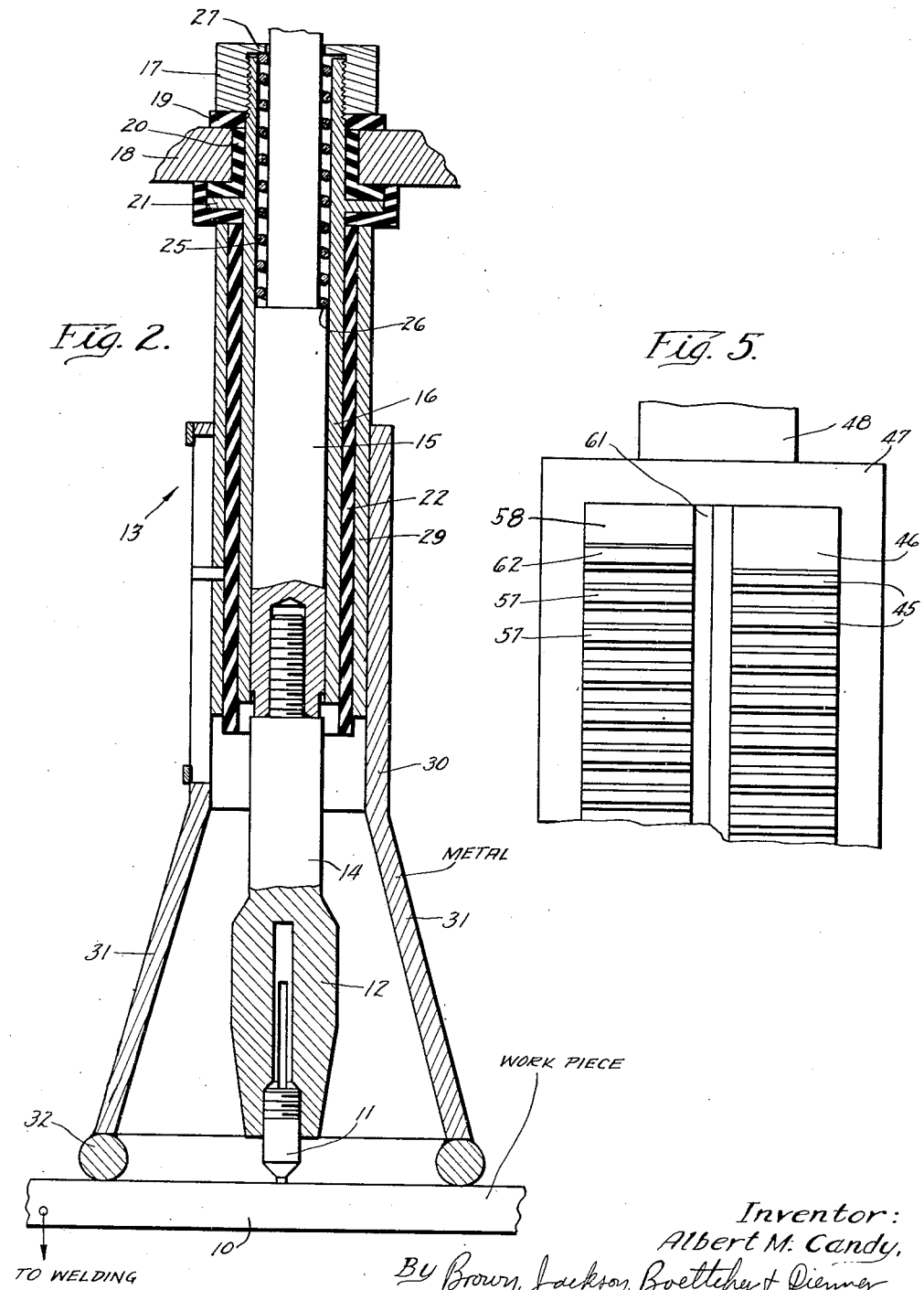

Patented Oct. 19, 1948

2,451,716

UNITED STATES PATENT OFFICE 2,451,716

MECHANISM FOR STUD WELDING GUNS AND THE LIKE

Albert M. Candy, La Grange, Ill., assignor, by mesne assignments, to National Cylinder Gas Company, Chicago, Ill., a corporation of Delaware Application September 28, 1946, Serial No. 700,054

16 Claims. (Cl. 219—4)

My invention relates, generally, to driving mechanisms, and it has particular relation to such means for stud welding guns and the like.

In my copending application Serial No. 620,295, filed October 4, 1945, I have disclosed a stud welding mechanism which can be employed in the welding of studs, such as disclosed in my application Serial No. 674,994, filed June 7, 1946. By means of this stud welding gun, it is possible to weld threaded studs to a work piece at various locations over its surface. In general, the device comprises a mechanism for receiving and handling the stud so as to bring it into the desired position on the work piece. Provision is made for withdrawing the stud a short distance from the work piece, in order to strike a welding arc therebetween. It will be understood, of course, that a source of welding current is connected between the stud handling mechanism and the work piece, and that the circuit thereto is completed in the proper timed sequence so as to strike the arc and to cause current flow sufficient to perform the necessary welding operations. After the arc is struck by withdrawing the stud from the work piece, the stud is moved to engagement with the work piece under considerable pressure, and subsequently the flow of welding current is cut off.

The present invention has particularly to do with the mechanism that is employed for withdrawing the stud from the work piece through the extent which must be controlled accurately. The present invention may be employed in conjunction with the stud welding apparatus disclosed in my copending application Serial No. 620,295, above referred to, and in similar welding apparatus.

The extent of movement of the stud away from the work piece to draw the arc is relatively slight. It may be of the order of $\frac{1}{16}''$, and in general will not exceed $\frac{1}{8}''$. After it has been determined what is the optimum extent of movement of the stud away from the work piece to give satisfactory results, it is necessary to maintain this extent of movement on repeated operations of the stud welding mechanism, in order to obtain uniform results. If the stud is moved too far away from the work piece, the resulting arc may be of greater extent than is necessary and too much metal may be volatilized. If the stud is not moved through a sufficient distance, the arc may not be developed to an extent sufficient to heat the required amount of metal or to raise it to the necessary temperature to form the weld when the stud is subsequently released, and moved back into engagement with the work piece.

It will be understood, of course, that the stud holding or handling mechanism should be free of the retracting mechanism prior to the initiation of the welding cycle. This facilitates the positioning of the stud in engagement with the work piece. Also, it permits the use of various lengths of studs without any changes in the stud handling apparatus that is required.

For withdrawing the stud from the work piece, a motor mechanism, such as an electromagnet, may be employed. It has been the practice to have the armature of the electromagnet move a driving rack, the teeth of which normally are out of engagement with a pinion. The pinion is arranged to operate through reduction gearing for driving a driven rack that is connected to the stud handling mechanism. Since the pinion associated with the driving rack normally is out of engagement therewith, the stud handling mechanism is free to move for properly locating the stud on the work piece. When the motor mechanism or winding of the electromagnet is energized, the driving rack is moved until the tooth thereof adjacent the pinion engages the same. Further movement of the driving rack is translated through the reduction gearing to effect the desired withdrawing movement of the stud handling mechanism.

Since the pinion normally is out of engagement with the rack, the teeth thereof bear no particular relation to the teeth of the rack that is operated by the driving motor or electromagnet. Thus, in certain positions of the pinion, the driving rack may move as much as the circular pitch width of a tooth and tooth space before driving engagement with the pinion is had. In other positions of the pinion, only a slight movement of the driving rack may be required in order to effect the desired driving engagement.

Since the extent that the stud is withdrawn from the work piece is governed by the extent of movement of the driving rack, it will be obvious that there may be substantial variation in the distance that the stud is withdrawn from the work piece during successive operations of the stud welding mechanism.

Accordingly, among the objects of my invention are: To place the motor mechanism or electromagnet which is energized to withdraw the stud from the work piece in a driving relation with the stud handling means with a minimum of lost motion; to permit the stud handling means to be free of engagement with the motor mechanism until the latter is energized, and then to operatively interconnect them with a minimum of movement of the motor mechanism; to interconnect the stud handling means and the motor mechanism with the rack and pinion means arranged so that there is no operative relation therebetween until the latter is energized; to prevent jamming of the rack and pinion teeth during the initial engagement; to relieve the pinion teeth along the top lands so as to prevent the first rack tooth from jamming against the top land of any pinion tooth and to permit engagement near the pitch circle; to stagger certain of the teeth of said rack and pinion means so that the load applied thereto is more uniformly distributed when the driving engagement takes place; to extend the tooth of the driving rack adjacent its pinion only to about 15% beyond the pitch line so as to (still further) prevent jamming and to distribute the load; and to guide the driving rack on its associated pinion so as to insure proper alignment therebetween. In the case of two staggered driving racks and pinions, it is only desirable to limit the length of the first tooth of the "leading" rack.

Other objects of my invention will, in part, be obvious and in part appear hereinafter.

My invention is disclosed and the embodiment thereof shown in the accompanying drawings, and it comprises the features of construction, combination of elements and of parts which will be exemplified in the construction hereinafter set forth, and the scope of the application of which will be indicated in the appended claims.

For a more complete understanding of the nature and scope of my invention, reference may be had to the following detailed description, taken together with the accompanying drawings, in which:

Figures 1 and 2, taken together with Figure 1, placed above Figure 2, illustrate a stud welding gun mechanism, in which my invention is incorporated;

Figure 3 is a detail sectional view, along the line 3—3 of Figure 4, and showing the relationship between the teeth of the pinions that are driven by the driving racks and their teeth, when they are in driving relation;

Figure 4 is a view, in side elevation, of the driving racks and the associated reduction gearing, and showing the staggered relationship between the teeth on the driving racks;

Figure 5 is a view, in front elevation, on the enlarged scale, showing a portion of the driving racks and the teeth in staggered relation thereon;

Figure 6 is a view, in side elevation, at an enlarged scale, illustrating the preferred shape of the teeth of the pinions and, the shortened first tooth of the "leading" rack; and Figure 7 is a view, similar to Figure 3, showing another embodiment of the invention.

Referring now particularly to Figure 2 of the drawings, it will be observed that the reference character 10 designates a work piece connected to one terminal of a welding current source, to which the stud 11 of the kind disclosed in my application Serial No. 674,994 is to be welded. It will be understood that the present invention can be employed with other types of stud, and that the showing of the stud 11 and the reference to application Serial No. 674,994 are for illustrative purposes only.

The stud 11 may be held or frictionally gripped by jaws 12 of a stud handling mechanism which is indicated, generally, at 13. Jaws 12 are located at the lower end of an extension 14, the upper end of which is threaded into the lower end of a shaft 15, that is mounted for sliding movement in an inner sleeve 16. The inner sleeve 16 is held in place by a nut 17 that is threaded onto its upper end.

The nut 17 clamps the inner sleeve 16 to a base 18, only a portion of which is shown in Figure 2. Since the shaft 15 and inner sleeve 16 are connected to one terminal of the welding current source, it is necessary to insulate them from the base 18, and also from contact by the operator. For this purpose, there are provided an insulating washer 19 and an insulating collar 20. It will be observed that the nut 17 bears against the washer 19, which, in turn, bears against the upper surface of the base 18. The collar 20 extends through the base 18, and has a flange which extends along its under surface and bears against a flange 21 that may be integrally formed with inner sleeve 16. An outer sleeve 22 of insulation surrounds the inner sleeve 16, and extends, as shown, from the underside of the base 18 and the underside of the flange 21 beyond the lower end of the sleeve 16.

In order to bias the shaft 15 downwardly to urge the stud 11 into engagement with the work piece 10, a coil compression spring 25 is located around the shaft 15. The spring 25 reacts between the shoulder 26 on the shaft 15 and the under side of a flange 27 that is integrally formed with the nut 17. It will be understood that, when the stud 11 is free of engagement with the work piece 10, the shaft 15 will be urged by the coil compression spring 25 relative to the inner sleeve 16 outwardly to an extent depending upon the extent that the shaft 15 is permitted to move through the nut 17 as limited by suitable stops; for example the lower nut 34 in Figure 1.

Surrounding the sleeve 22 of insulation is an outer sleeve 29 to which a support 30 may be adjustably secured as illustrated in my co-pending application Serial No. 620,295. The lower end of the support 30 is flared outwardly, and comprises legs 31, which may be secured, as by welding, to a ring 32, the under side of which bears, as shown, against the upper surface of the work piece 10.

Reference may now be had to Figure 1 of the drawings, where the upper extension of the shaft 15 is illustrated. Clamp nuts 34 may be threaded on the shaft 15 to secure a terminal flange 35 therebetween to permit a connection to the other terminal of the welding source. At its upper end the shaft 15 is provided with a driven rack 36, the teeth of which are indicated at 37. It will be understood that the driven rack 36 is connected to the shaft 15 through suitable insulating means so as to insulate the driven rack 36 and the parts associated therewith from the shaft 15. However, for illustrative purposes, and in order to disclose the present invention more clearly, the rack 36 is illustrated as being connected directly to the shaft 15.

The teeth 38 of a pinion 39 mesh with the teeth 37 of the rack 36, and this engagement is normally maintained, i. e., the teeth 38 are always in engagement with the teeth 37. The pinion 39 is mounted for conjoint rotation with a gear wheel 40 on a suitable shaft 41, Figure 3. The gear wheel 40 has teeth 42 which engage teeth 43 of a pinion 44, which, in turn, are arranged to engage teeth 45 of a driving rack 46. The driving rack 46 is mounted on a rack carrier 47, which has an extension 48 to which it will be understood is attached the armature of an electromagnet that is indicated at 49. The winding of the electromagnet 49 may be energized from a suitable source 50, which may be an alternating current source, on closure of a push button switch 51.

The teeth 43 of the pinion 44 normally are out of engagement with the teeth 45 of the driving rack 46. Also, as will appear in more detail hereinafter, teeth 56 on a pinion 55 normally are out of engagement with teeth 57 of a driving rack 58. This permits the shaft 15 and the driven rack 36 to be moved freely so as to permit the positioning of the stud 11 in engagement with the work piece 10. This also permits various lengths of stud 11 to be employed, without requiring any changes in the construction or adjustment of the stud handling mechanism 13. As the driven rack 13 is moved in positioning the stud 11, corresponding movements of the pinion 39 and gear wheel 40 and pinions 44 and 55 take place.

It will be apparent that the teeth 43 of the pinion 44 are not located in any particular relation to the teeth 45 of the rack 46, so that, on operation of the electromagnet 49 the pinion 44 will be rotated to an extent which corresponds substantially to the extent which the driving rack 46 is moved. These conditions also apply to pinion 55 and "leading" rack 58.

Accordingly, in accordance with my invention, I have mounted the pinion 44 for rotation on a shaft 54, to which is also secured a second pinion 55 having teeth 56 which are staggered with respect to the teeth 43 of the pinion 44, one tooth width. Thus the teeth 56 of the pinion 55 are located in register with the spaces between the teeth 43 on the pinion 44.

The teeth 56 of the pinion 55 are arranged to engage teeth 57 on a second driving rack 58, which teeth are in the same staggered relationship so that, as shown in Figures 4 and 5, the teeth 57 are in register with the spaces between the teeth 45.

The pinions 44 and 55, in effect, constitute twin pinions, with their teeth in staggered relation, and they engage respectively twin racks 46 and 58, both of which are mounted on and move with rack carrier 47. Now it will be apparent that, when the electromagnet 49 is energized, and the rack carrier 47 is moved upwardly in the direction indicated by the arrow thereon, Figure 1, either the upper tooth of the set of teeth 57 will engage a tooth 56 of pinion 55 or both this engagement and the engagement of the upper tooth of the set of teeth 45 with a tooth 43 of pinion 44 will take place, depending upon the angular relation between these pinions and the racks 46 and 58.

It is desirable that the pinions 44 and 45 be accurately guided with respect to the driving racks 46 and 58. For this purpose, a washer or flange 60 may be located between the pinions 44 and 55, and it may extend into a slot 61 between the driving racks 46 and 58. The washer 60 prevents the teeth 45 and 57 of the racks 46 and 58 from engaging too deeply the teeth 43 and 56 of the pinions 44 and 55.

In order to minimize jamming of the top tooth 62 of the driving rack 58 with the teeth of the pinion 55, the uppermost tooth 62 of the set of teeth 57 is cut off, as indicated in Figure 4, near the pitch line. This also distributes more uniformly the load on the top two teeth of the sets of teeth 45 and 57 and the pinion teeth 43 and 56, especially when tooth 62 just misses a pinion tooth 56.

By employing the gear reduction which is provided by the pinion 39 and the gear wheel 40, it is possible to use a smaller electromagnet 49 than would otherwise be the case if the pinion 44 were directly in engagement with the driven rack 36. However, it will be apparent that the reduction gearing can be dispensed with, and that the pinion 44 can be arranged to drive the driven rack 36 in lieu of the pinion 39.

As illustrated in Figure 6, the top lands 63 of the teeth 56 (likewise the corresponding top lands of teeth 43) are relieved. This eliminates the possibility of the leading edge of the first rack tooth from jamming against the top land of the next pinion tooth. This also provides that, when the first rack tooth 62 of the set of teeth 57 misses a pinion tooth, it will engage the next pinion tooth near the pinion pitch circle.

In Figure 7 of the drawings I have shown a third pinion 65 on shaft 54 which may be in driving engagement with gear wheel 40 in lieu of pinion 44. This arrangement is desirable when the teeth 43 and 56 of the pinions 44 and 55 are relieved as described hereinbefore.

Since certain further changes can be made in the foregoing construction and different embodiments of the invention can be made without departing from the spirit and scope thereof, it is intended that all matter shown in the accompanying drawings and described hereinbefore shall be interpreted as illustrative, and not in a limiting sense.

I claim as my invention:

1. In stud welding apparatus wherein a stud to be welded to a work piece is held in a stud welding machine and is arranged to be withdrawn therefrom a short distance by longitudinal movement of a shaft in response to energization of motor means to strike a welding arc between the stud and the work piece, in combination, a driven rack secured to and movable with said shaft, a driving rack arranged to be operated by said motor means, and gear means for operatively interconnecting said racks, said driving rack having a plurality of sets of teeth thereon in staggered relation and the gear means for engaging the same having a plurality of sets of teeth in the same staggered relation and being normally out of engagement therewith and arranged to engage the same on energization of said motor means whereby said engagement takes place after a minimum of movement of said driving rack.

2. The invention, as set forth in claim 1, wherein the driving rack and the gear means for engaging the same have two sets of teeth in staggered relation and the top lands of the teeth of said gear means that are engaged by the teeth of said driving rack are relieved to permit the initial engagement to take place substantially at the pitch line.

3. The invention, as set forth in claim 1, wherein the driving rack and gear means for engaging the same have two sets of teeth in staggered relation and certain of said teeth are relieved to prevent jamming of the same when the initial engagement takes place.

4. The invention, as set forth in claim 1, wherein the tooth of the driving rack adjacent the gear means extends only to near the pitch line to prevent jamming of the teeth when said driving rack is moved by the motor means and to distribute the loading of the teeth of said driving rack adjacent said gear means.

5. The invention, as set forth in claim 1, wherein guiding means operates between the driving rack and the gear means to maintain predetermined relation therebetween.

6. The invention, as set forth in claim 1, wherein the driving rack and the gear means for engaging the same have two sets of teeth in staggered relation and a flange extends between said sets of teeth on said gear means into a slot in said driving rack between said sets of teeth thereon.

7. The invention, as set forth in claim 1, wherein the gear means includes a pinion in constant engagement with the driven rack, a gear wheel rotatable conjointly with said pinion, and a pinion carrying two sets of teeth in staggered relation for engaging corresponding sets of teeth on the driving rack, said gear wheel being in constant engagement with one of said sets of teeth of the last named pinion.

8. The invention, as set forth in claim 1, wherein the gear means includes a pinion in constant engagement with the driven rack, a gear wheel rotatable conjointly with said pinion, a pinion carrying two sets of teeth in staggered relation for engaging corresponding sets of teeth on the driving rack, and a pinion rotatable conjointly with the last named pinion and being in constant engagement with said gear wheel.

9. In stud welding apparatus wherein a stud to be welded to a work piece is held in a stud welding machine and is arranged to be withdrawn therefrom a short distance by longitudinal movement of a shaft in response to energization of motor means to strike a welding arc between the stud and the work piece, in combination, a driven rack secured to and movable with said shaft, a driving rack arranged to be operated by said motor means, and gear means for operatively interconnecting said racks, the tooth of the driving rack adjacent said gear means extending only to near the pitch line to prevent jamming of the teeth when said driving rack is moved by said motor means and to distribute the loading of the teeth of said driving rack adjacent said gear means.

10. The invention, as set forth in claim 9, wherein the top lands of the teeth of the gear means are relieved to permit the initial engagement by the driving rack teeth to take place substantially at the pitch line.

11. In stud welding apparatus wherein a stud to be welded to a work piece is held in a stud welding machine and is arranged to be withdrawn therefrom a short distance by longitudinal movement of a shaft in response to energization of motor means to strike a welding arc between the stud and the work piece, in combination, a driven rack secured to and movable with said shaft, a first pinion in constant engagement with said driven rack, a gear wheel rotatable conjointly with said pinion, a second pinion having two sets of teeth in staggered relation of one-half tooth pitch with one set of teeth in constant driving engagement with said gear wheel, and a driving rack arranged to be operated by said motor means and having two sets of teeth in the same staggered relation as said second pinion and normally out of engagement therewith and arranged to engage the same on energization of said motor means.

12. In stud welding apparatus wherein a stud to be welded to a work piece is held in a stud welding machine and is arranged to be withdrawn therefrom a short distance by longitudinal movement of a shaft in response to energization of motor means to strike a welding arc between the stud and the work piece, in combination, a driven rack secured to and movable with said shaft, a first pinion in constant engagement with said driven rack, a gear wheel rotatable conjointly with said pinion, a second pinion having two sets of teeth in staggered relation of one-half tooth pitch with one set of teeth in constant driving engagement with said gear wheel, and a driving rack arranged to be operated by said motor means and having two sets of teeth in the same staggered relation as said second pinion and normally out of engagement therewith and arranged to engage the same on energization of said motor means, the top lands of the teeth of said pinion that are engaged by the corresponding teeth of said driving rack being relieved to permit the initial engagement to take place substantially at the pitch line.

13. In stud welding apparatus wherein a stud to be welded to a work piece is held in a stud welding machine and is arranged to be withdrawn therefrom a short distance by longitudinal movement of a shaft in response to energization of motor means to strike a welding arc between the stud and the work piece, in combination, a driven rack secured to and movable with said shaft, a first pinion in constant engagement with said driven rack, a gear wheel rotatable conjointly with said pinion, a second pinion having two sets of teeth in staggered relation of one-half tooth pitch with one set of teeth in constant driving engagement with said gear wheel, and a driving rack arranged to be operated by said motor means and having two sets of teeth in the same staggered relation as said second pinion and normally out of engagement therewith and arranged to engage the same on energization of said motor means, the teeth of said second pinion being relieved in such manner as to prevent jamming with the teeth of said driving rack when the initial engagement thereof takes place.

14. In stud welding apparatus wherein a stud to be welded to a work piece is held in a stud welding machine and is arranged to be withdrawn therefrom a short distance by longitudinal movement of a shaft in response to energization of motor means to strike a welding arc between the stud and the work piece, in combination, a driven rack secured to and movable with said shaft, a first pinion in constant engagement with said driven rack, a gear wheel rotatable conjointly with said pinion, a second pinion having two sets of teeth in staggered relation of one-half tooth pitch with one set of teeth in constant driving engagement with said gear wheel, a driving rack arranged to be operated by said motor means and having two sets of teeth in the same staggered relation as said second pinion and normally out of engagement therewith and arranged to engage the same on energization of said motor means, and a flange extending radially from said second pinion into a slot in said driving rack for guiding the same in their relative movement.

15. In stud welding apparatus wherein a stud to be welded to a work piece is held in a stud welding machine and is arranged to be withdrawn therefrom a short distance by longitudinal movement of a shaft in response to energization of motor means to strike a welding arc between the stud and the work piece, in combination, a driven rack secured to and movable with said shaft, a first pinion in constant engagement with said driven rack, a gear wheel rotatable conjointly with said pinion, a second pinion having two sets of teeth in staggered relation of one-half tooth pitch with one set of teeth in constant driving engagement with said gear wheel, a driving rack arranged to be operated by said motor means and having two sets of teeth in the same staggered relation as said second pinion and normally out of engagement therewith and arranged to engage the same on energization of said motor means, and a flange extending radially between said two sets of teeth on said second pinion into a slot between said two sets of teeth on said driving rack.

16. In stud welding apparatus wherein a stud to be welded to a work piece is held in a stud welding machine and is arranged to be withdrawn therefrom a short distance by longitudinal movement of a shaft in response to energization of motor means to strike a welding arc between the stud and the work piece, in combination, a driven rack secured to and movable with said shaft, a first pinion in constant engagement with said driven rack, a gear wheel rotatable conjointly with said pinion, a second pinion having two sets of teeth in staggered relation of one-half tooth pitch with one set of teeth in constant driving engagement with said gear wheel, and a driving rack arranged to be operated by said motor means and having two sets of teeth in the same staggered relations as said second pinion and normally out of engagement therewith and arranged to engage the same on energization of said motor means, the tooth of said sets of teeth on said driving rack nearer to said second pinion extending only to near the pitch line to prevent jamming of the teeth when said driving rack is moved by said motor means and to distribute the loading between the first teeth of said sets of teeth on said driving rack.

ALBERT M. CANDY.

REFERENCES CITED

The following references are of record in the file of this patent:

UNITED STATES PATENTS

| Number | Name | Date |
|---|---|---|
| 2,265,169 | Hughes et al. | Dec. 9, 1941 |